Patented Aug. 21, 1945

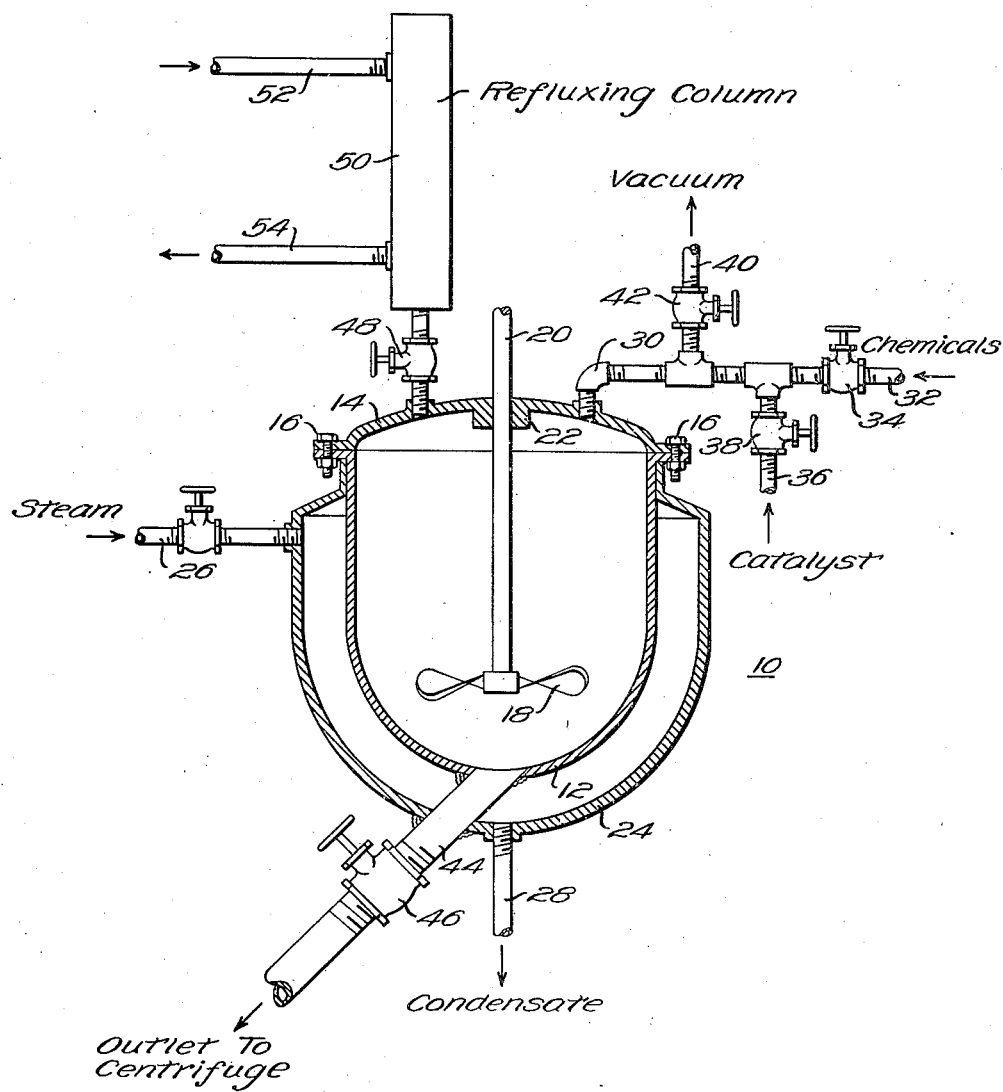

2,383,430

UNITED STATES PATENT OFFICE 2,383,430

RESINS

William C. Weitman, Wilkinsburg, Pa., assignor to Westinghouse Electric Corporation, East Pittsburgh, Pa., a corporation of Pennsylvania Application July 15, 1942, Serial No. 451,035

5 Claims. (Cl. 260—30)

This invention relates to resins, and more particularly, to phenolic resins.

This application is a continuation-in-part of application Serial No. 347,112, filed July 24, 1940, and assigned to the assignee of the present invention.

The phenolic condensation products prepared by reacting phenols and aldehydes have achieved widespread use in the arts and industries due to their low cost, ease of manufacture and superior mechanical and chemical characteristics. When combined with fillers to produce laminated products, moldings embodying the phenol resins have exhibited characteristics which are superior on many counts to other synthetic resins. Accordingly, the production and use of phenol resins exceed that of practically all of the other synthetic resins combined.

The phenol synthetic resins are subject to certain drawbacks in applications for which they are otherwise admirably suited. A serious drawback is the fact that light colors and transparent sections are not easily obtainable in phenol resins. Ultra-violet light causes rapid deterioration in phenolic resins. Several other resins have better abrasion resistance properties than is possessed by phenol resins. In addition, most phenolic resins as prepared heretofore have had a characteristic pungent odor. Therefore, it is desirable in some instances to combine a resin having superior appearance, odor and abrasion resisting characteristics as a surface layer on a body of a phenolic resin which has lower cost and better strength characteristics.

Up to the present time, the main factor which hindered the application of surface layers of resins with certain desirable properties upon a phenolic resin was the fact that the two resins would not bond satisfactorily. Some attempts have been made in the prior art to provide for combining two dissimilar synthetic resins of this type by mechanical expedients—for example, applying a layer of phenol resin to one side of a paper filler sheet and a surface layer of another resin on the other side of the same filler sheet. The filler sheet acts in this case as a combining or uniting medium for the two resins. However, the two resins do not come in contact or bond with each other. Since the union between the resins combined in this way consists of paper fibers, it is not very great, and is subject to failure under adverse conditions.

It is a purpose of the present invention to produce a phenol base resin which will bond directly to a different type of resin to produce a composite article having superior and more uniform strength characteristics than produced heretofore.

In addition, the characteristics of the phenolic resin produced according to this invention are superior to those possessed by phenol resins of the prior art. In particular, the phenol resin may be polymerized at temperatures of 140° C. and lower to produce an infusible condensate which is relatively odorless and has good moisture resistance.

Another highly desirable feature of the resin of this invention is the property of withstanding a number of heat-treatments without being rendered infusible. Thus a solution of the resin may be applied and heat treated to remove the solvent. Other resin solutions may be applied subsequently and each heat-treated without the phenolic resin becoming infusible or losing its moldability.

The object of this invention is to provide a phenolic resin which will thermoset or become infusible at a low temperature.

Another object of this invention is to provide for a phenol varnish material suitable for impregnating filler material and capable of being heat-treated several times without losing its moldability.

A further object of the invention is to provide for a phenol resin which will bond with other synthetic resins to form a strong union with the other synthetic resin.

For a fuller understanding of the nature and objects of the invention, reference may be had to the following detailed description taken in conjunction with the accompanying drawing, in which the single figure of the drawing is a view partly in section through a reaction vessel.

In the present state of the synthetic resin art, phenol resins possessing the highly desirable characteristics of good mechanical strength and low cost lack some surface finish characteristics and are not available in a wide range of colors. The phenol resins are available mainly in dark colors, and they do not exhibit the polish and eye appeal that is highly desirable in modern merchandise. Many available synthetic resins other than phenol resins exhibit superior abrasion and lasting characteristics.

In particular, the urea resins, though more costly than the phenolics, have advantages in point of color and surface finish. Pigmented urea-formaldehyde resins are available in all colors ranging from pure white to any desired hue in the spectrum. Urea resins furthermore are highly resistant to abrasion, chemical reagents, moisture, ultra-violet light, and the effect of various gases present in the atmosphere. They are substantially odorless as well.

In order to combine satisfactorily a phenolic resin with a surface layer of a resin, such, for example, as the urea resin above-mentioned, it is the purpose of the invention to produce a phenolic resin varnish which will bond satisfactorily directly with the urea resin. The requirements of bonding with urea resin include the necessity for polymerization of the phenol base varnish into the infusible or C-stage resin at temperatures of the order of 140° C. or lower, since above 140° C. the urea resins darken and decompose rapidly. The phenolic resin of the invention meets this requirement. The copending patent application of H. C. Guhl, Serial No. 347,233, filed July 24, 1940, now Patent No. 2,292,118, discloses a product of this type.

In addition, the phenol base varnish which is produced by this invention is entirely stable in storage. The varnish will not thicken to any appreciable extent at room temperature after being in storage for a time period of over one month. There is no appreciable chemical change in the varnish after being stored for a period of time of this length.

It has been found that when combined with filler material, such as cellulose paper or cloth, glass cloth and the like, the phenol base varnish produced by this invention has highly satisfactory "greenness." This property of "greenness" is a conjoint property of moldability and exudation which is determined for a sheet of filler material impregnated with a phenol base varnish and dried. When two resin impregnated sheets cannot be molded into a unit, the resin is said to have lost its "greenness." Under heat and pressure, a certain amount of the varnish will exude in a fused state out of the filler sheets while being molded. While ordinarily moldability and exudation are closely related, it has been discovered that for the phenol varnish of this invention, the exudation from a filler having 50% to 70% by weight of resin under pressure of 1000 pounds per square inch at 150° C. may be as low as 1% while the varnish still retains a high degree of moldability. "Greenness" for the purpose of this invention may be defined as the percent of exudation of the resinous impregnant from a filler material, while the treated material is still moldable under a pressure of 1000 pounds per square inch at a temperature of 150° C. It has been found that the varnish produced by the process hereinafter described has a "greenness" of less than 1% to 5%, while retaining satisfactory molding properties. For certain purposes such low "greenness" is highly desirable since no striking through a surface layer of another resin on the same piece of filler occurs. In addition, wastage of resin by exudation from the filler is minimized.

In the production of the type of phenol base resin varnish hereinbefore referred to, the base materials are phenols and formaldehyde, formaldehyde isomers and other aldehydes as well known to those skilled in the art. A particularly satisfactory phenol for this purpose is the mixture of cresols and xylenols, commercially known as cresylic acid. Ordinary phenol and meta-para cresol have been used with success. However, other phenols may be used for preparing this varnish.

A 40% formaldehyde is employed for reaction with the cresylic acid, since it is a standard material available on the market. Formaldehyde base materials, such as the various isomers of formaldehyde and related substances, may be substituted for the 40% formaldehyde solution above indicated. The specific process hereinafter detailed will be described in reference to 40% formaldehyde solution, but substitution of these various other formaldehyde base materials will be obvious to those skilled in the art.

In preparing the resin, a closed reaction vessel 10, such as disclosed by the single figure of the drawing, is ordinarily employed. The reaction vessel 10 is composed of a main body 12 and a cover 14 which may be hermetically attached to the body 12 by fastening means 16 and suitable gaskets. In order to promote a complete and thorough reaction, a stirring propeller 18 is provided. It is operated by shaft 20 passing through stuffing box 22. A motor (not shown) drives shaft 20. Surrounding the body 12 of the reaction vessel is a steam jacket 24 supplied with steam by a line 26. Steam condensate is vented at 28.

The chemicals are introduced into the reaction vessel through a filling inlet 30. The cresylic acid and formaldehyde may be introduced by a pipe line 32 connected to suitable containers (not shown) from which weighed portions of reactants may be obtained. Valve 34 regulates entry of the reactants.

A second line 36 is connected to the inlet 30 in order to provide for the introduction of polymerizing catalysts. Valve 38 controls the catalyst line 36. In addition, a vacuum line 40 controlled by valve 42 is connected to inlet 30. After the reaction has progressed to the desired point, the contents of the closed reaction vessel may be dumped through the outlet 44 which leads to a centrifuge or other clarifying apparatus. A control valve 46 is placed in outlet line 44.

In case refluxing is desired, the refluxing column 50 is attached to the cover 14. Valve 48 controls the passage of gaseous constituents to the column 50. Pipes 52 and 54 are the inlet and outlet, respectively, of cooling water to the reflux column 50 to cause condensation of vapors.

In producing phenolic resin of this invention having the particularly desirable properties set forth herein, one mol of phenol is combined with from 0.8 to 1.2 mols of aldehyde, such as formaldehyde. Any greater excess of formaldehyde is not only unnecessary but leads to several undesirable results. When 1.5 mols of formaldehyde per mol of phenol are employed in the reaction the resulting resin gives off a strong odor, particularly when wet or when moisture is present. The excessive amount of formaldehyde also renders the resin much more reactive and more responsive to heat-treatment to reach an infusible state.

For the best non-odoriferous properties the formaldehyde should be one mol or less per mol of phenol. Extensive tests have shown that the excess formaldehyde and not the phenol is the cause of the characteristic pungent odor associated with phenolic resins. Weltman patent application Serial No. 423,462, filed December 18, 1941, gives a more detailed discussion of this feature.

Examples of suitable proportions of reactants are the following:

|  | Parts |
|---|---|
| 1. Cresylic acid | 1250 |
| 40% formaldehyde | 840 |
| 2. Meta-para cresol | 1200 |
| 40% formaldehyde | 750 |
| 3. Phenol | 1000 |
| 40% formaldehyde | 600 |

Weighed quantities of the phenol and aldehyde are introduced into the reaction vessel 10 through line 32—30, valve 34 being closed after the ingredients have been introduced into the vessel.

Approximately one-third of 1%, based on the weight of the phenol, of a catalyst having a relatively strong effect on the reaction is added to this mixture of reactants by means of pipe line 36 and valve 38. The stirring propeller 12 is set in motion and steam is admitted to jacket 24 when the catalyst has been added. The mixture is heated to boiling. Reaction is continued for approximately one-half hour after boiling starts with refluxing.

Suitable catalysts for effecting reaction of the cresylic acid in formaldehyde at this stage are the metallic hydroxides selected from the group of alkali metal hydroxides and alkaline earth metal hydroxides. Suitable catalysts from this group are potassium hydroxide, sodium hydroxide, calcium hydroxide and barium hydroxide.

In some instances it has been found satisfactory to vary the amount of the catalyst from ⅛ to 1 part for 100 parts of the phenol, the time of refluxing and stirring of the catalysts with the reactants inversely corresponding to one-half hour for one-third of 1% of catalyst. Thus one hour of refluxing is required for ⅛ part of catalyst per 100 parts of the phenol, as cresylic acid.

At the end of this time period a certain amount and type of resinification between the cresylic acid and formaldehyde has occurred. The resin at this stage is satisfactory for some uses. It has been found, however, that better ageing and thickening characteristics during storage are achieved by removing the metallic hydroxide catalyst and substituting a secondary catalyst and further continuing the reaction which promotes a different type of reaction and advances the degree of resinification after this initial stage.

At the end of the time period corresponding to one-half hour for ⅓ part of metallic hydroxide catalyst per 100 parts of phenol, the vacuum line valve 42 is opened and vacuum applied to the contents of the reaction vessel. Both moisture and excess formaldehyde are withdrawn by the evacuation treatment. Within a short time after the evacuation has been started, the secondary catalyst may be introduced through line 36 by opening valve 38 while closing valve 42 temporarily.

The secondary catalyst which it is preferred to use in this application consists in part of an ammonium salt, which, when introduced into the initial reaction mixture, will form a metallic salt precipitate with the alkali or alkaline earth metal and ammonium hydroxide from the hydroxide radical of the catalyst present. Ammonium sulfate has been particularly successful in achieving this chemical reaction. Ammonium sulfate in quantities sufficient to react with substantially all the sodium hydroxide, for example, to form sodium sulfate and ammonium hydroxide, is introduced as a water solution. The sodium sulfate precipitates in the phenol formaldehyde resinous product when the water has been removed by evacuation.

Additional ammonium hydroxide is also added in order to cause the second stage of resinification to proceed, usually from 2 to 4 parts of 30% aqua ammonia solution is added and the contents stirred for a short time.

Thereafter the vacuum line valve 42 is opened to remove moisture. The preferred operating temperature is from 50 to 70° C. at this stage while water is being evaporated by the vacuum treatment. Near the final stage of reaction the temperature may range from 85° C. to 110° C. The evacuation treatment assists in reducing the temperature of the reaction mixture so that overheating does not readily occur.

The second stage of polymerization is allowed to proceed for a time period of from one and one-half to two and one-half hours, at the end of which period the material within the reaction vessel is a thick viscous resin and substantially all of the moisture has been removed. It is believed that any unreacted excess of formaldehyde has either been removed or is combined with the ammonia to form hexamethylenetetramine. Dispersed within this resinous mass is a small amount of sodium sulfate precipitate. The product is substantially an A-stage phenol formaldehyde resin.

In order to provide for applying the resin to fabrics or paper film, 70 to 100 parts of a solvent consisting of from 35 to 100 parts of ethyl alcohol and up to 50 parts of benzene solvents, such as benzol, toluene, xylene and other phenol-formaldehyde solvents or other suitable solvents are added to the resin. A satisfactory mixture consists of 50% ethyl alcohol and 50% benzol. Ethyl alcohol alone is also a satisfactory solvent. This solvent may be introduced through the chemical pipe line 32 and valve 34. Stirring the solvent into the resin will kill the reaction. The viscous resinous product will be thinned out sufficiently by the addition of the solvent for easier storage and later application.

The valve 46 is now opened and the contents of the reaction vessel are put through a centrifuge or other clarifying apparatus (not shown) in order to remove the sodium sulfate or other precipitate and to clarify the resinous solution of deleterious substances. The clarified product constitutes a phenolic varnish which is suitable for impregnation of fabric, paper or other filler materials in order to mold laminated phenolic products therefrom.

A particularly advantageous use for the phenol varnish prepared in this way is as a dip coating for a single sheet of filler material, such as paper, from one side of which any excess of the varnish is removed by scraping, and thereafter a coating of urea formaldehyde or melamine resin is applied to the scraped side of the impregnated and dried sheet. This sheet is particularly useful as a decorative top or surface sheet to be bonded to a base of regular phenol formaldehyde material. The aforementioned copending Patent 2,292,118 discloses such a material in detail.

Good bonding of the urea resin surface layer to the phenolic base is necessary in order to prevent moisture penetrating and causing the delamination of the urea resin surface from the phenolic resin body. When in use, decorative panels of this type of material may be subjected to conditions of high humidity, or even repeatedly wetted, as during cleaning thereof. Moisture resistance is a critical characteristic of the bond.

In preparing decorative surface sheets by applying urea-formaldehyde or a melamine aldehyde resin to a sheet impregnated with the phenolic resin, it is necessary to heat treat the phenolic resin twice. Initially the phenolic resin varnish is applied to the surface sheet, excess resin scraped off and the sheet heat treated at temperatures of about 140° C. to remove the solvent and to convert the resin to the B-stage. The urea-formaldehyde resin is then applied as a paint or varnish to the scraped surface and a second heat-treatment at temperatures of from 100° to 125° C. is employed to remove the solvent.

In both cases the temperatures are high enough to carry the degree of polymerization forward and ordinary phenolic resins would become completely infusible after the second heat treatment. Reaching an infusible state at this point would defeat the purpose for which the top sheets were prepared—namely, molding with an all phenolic base panel. The phenolic resin produced by this invention, however, can be heat-treated twice in a top or surface sheet and still possesses "greenness," that is, it is moldable and will bond to other sheets impregnated with phenolic resin.

The "greenness" of the phenolic resin impregnant produced by this invention may be less than 1%. Filler impregnated with the phenolic resin will mold to any desired shape and bond satisfactorily with minute flow out of the filler. This extremely low exudation is a considerable advance over the customary prior art resins where exudation of the order of 10% for corresponding amounts of resin is regarded as necessary to secure good molding and bonding between laminations.

Experimental tests of laminated articles embodying a decorative surface consisting of urea resin bonded with the phenolic resin produced by this invention confirm the exceptional characteristics of the bond. The low "greenness," less than 1%, of the phenolic resin has reduced any striking of the resin through the urea resin surface layer to a negligible amount. The moldability and bonding, however, have been as good as or even exceeded those exhibited by any prior art phenolic resin. Panels of this kind have been subjected to boiling water for periods of over two hours without any sign of delamination of the urea resin from the present phenolic resin. On the other hand, laminated panels conforming to the best practice of the prior art, when subjected to boiling water delaminated in a few minutes and the urea layer lifted off.

As hereinbefore mentioned, the phenol resin produced by the above process is extremely stable in storage in that it does not thicken or deteriorate chemically. Even after months, its "greenness" or flow under selected standard conditions is low, while adequate moldability is retained.

The resin actually bonds with urea to form a firm and stable composite article. The phenol resin will polymerize to the infusible or C-stage at temperatures of 140° C. or lower with a satisfactory molding cycle. This relatively low temperature is particularly important in treating urea-aldehyde resins, since the urea resins, will decompose rapidly at higher temperatures.

The phenolic varnish produced by the above process may be used alone, as well as with other resins. It need not be used with a filler or binder of any sort, but a solid phenolic resin object may be made therefrom.

Since certain obvious changes may be made in the above procedure and different embodiments of the invention could be made without departing from the scope thereof, it is intended that all matter contained in the above description shall be interpreted as illustrative and not in a limiting sense.

I claim as my invention:

1. A phenolic base impregnating varnish having a greenness of from less than 1% to 5% at 150° C, and 1000 pounds per square inch when combined with a sheet cellulose filler, the varnish capable of bonding to urea resins and polymerizing at temperatures of about 140° C. and lower into an odorless and infusible condensate, comprising the reaction product of 1 mol of a phenol and from 0.8 to 1.2 mols of 40% formaldehyde solution reacted at about the boiling point of the mixture, the reaction being catalyzed initially with from about 1/6% to 1% of the weight of the phenol of a hydroxide of a metal selected from the group consisting of alkali metals and and alkaline earth metals, the unreacted formaldehyde being removed by evacuation and the initial catalyst being neutralized, the initial reaction being conducted for a period of time inversely proportional to the amount of catalyst and corresponding to about one-half hour for 1/3%, and the reaction to form a resin being completed with ammonium hydroxide catalyst, and a solvent for the resin, the resin and solvent combined to produce a liquid varnish.

2. The method of preparing a phenolic base impregnating varnish having good low greenness when combined with a filler, capable of polymerizing at temperatures of about 140° C. or below into an infusible body, which comprises reacting at about the boiling point of the mixture 1.0 mol of a phenol and from 0.8 to 1.2 mols of formaldehyde with from about 1/6% to 1% of the weight of the phenol of an alkali hydroxide catalyst to effect an initial reaction, evacuating to remove unreacted formaldehyde and water, the initial reaction being conducted for a period of time inversely proportional to the amount of catalyst and corresponding to about one-half hour for 1/3%, introducing an ammonium salt and ammonium hydroxide into the partially reacted mixture, the ammonium salt chemically reacting with the alkali hydroxide to produce an alkali salt, which will precipitate, and ammonium hydroxide, the total ammonium hydroxide effecting a secondary catalytic reaction to produce a resinified material, dissolving the resinified material in a solvent and centrifuging the resin solution to remove the alkali salt precipitate and to effect clarification.

3. The method of producing a phenolic base resin varnish capable of polymerizing at temperatures of about 140° C. or below into an infusible condensate, which comprises reacting at about the boiling point of the mixture 1.0 mol of a phenol and from about 0.8 to 1.2 mols of formaldehyde, in the presence of an initial catalyst selected from the hydroxides of the group consisting of alkali metals and alkaliine earth metals to produce a partial reaction of the bases, and after a period of time corresponding to about one-half hour for 1/3% of catalyst based on the weight of the phenol evacuating to remove unreacted formaldehyde and water, thereafter introducing ammonium sulfate into the initial reaction product in sufficient amount to provide for a substantially complete precipitate of the sulfate of the metal present as the hydroxide and to produce ammonium hydroxide, introducing additional ammonium hydroxide to the initial reaction product, the total ammonium hydroxide effecting a secondary catalytic reaction of the partially reacted bases to produce a resinous substance, adding a solvent to put the resinous substance into solution and centrifuging the resinous solution to remove the precipitate of metal sulfate and to effect clarification, the centrifuged solution being a stable, substantially non-ageing resin varnish, which when applied to filler material and molded has high viscosity, good low greenness, is capable of bonding with urea resins and produces an odorless, moisture-resisting solid.

4. The method of producing a phenolic base resin varnish capable of polymerizing at temperatures below 140° C. into an odorless and moisture-resisting infusible condensate, which comprises reacting in a closed reaction vessel 1 mol of a phenol and from about 0.8 to 1.2 mols of 40% formaldehyde solution and ⅛ to 1 part of a catalyst per 100 parts of phenol selected from the hydroxides of the group consisting of alkali metals and alkaline earth metals, the whole being refluxed for a time period corresponding to about one-half hour for ⅓ part of catalyst to effect an initial reaction, the time of refluxing being inversely proportional to the amount of catalyst present, evacuating the reaction vessel at the termination of the time period to remove water and unreacted formaldehyde, adding sufficient ammonium sulfate to chemically react with substantially all of the metal hydroxide to provide for a precipitate of metal sulfate and to produce ammonium hydroxide, and further adding 2 to 4 parts of 30% aqueous ammonium hydroxide solution per 100 parts of phenol, the total ammonium hydroxide causing a secondary reaction between the phenol and formaldehyde to produce a resinous substance, the temperature in the reacting mixture being maintained at about 50 to 70° C. while moisture is being evacuated and reaching a final temperature of 85° C. to 110° C., introducing a solvent into the reaction vessel after the secondary reaction has proceeded one and one-half to two and one-half hours to produce a resinous varnish solution and removing the precipitated metal sulfate from the varnish solution.

5. The method of producing a phenolic base resin varnish capable of polymerizing at temperatures below 140° C. into an odorless and moisture-resisting infusible condensate, which comprises in a closed reaction vessel 1.0 mols of cresylic acid and from about 0.8 to 1.2 mols of 40% formaldehyde solution and ⅛ to 1 part of a catalyst per 100 parts of the cresylic acid selected from the hydroxides of the group consisting of the alkali metals and alkaline earth metals, the whole being refluxed for a time period corresponding to about one-half hour for ⅓ part of catalyst to effect an initial reaction, the time of refluxing being inversely proportional to the amount of catalyst present, evacuating the reaction vessel at the termination of the time period to remove water and unreacted formaldehyde, adding sufficient ammonium sulfate to chemically react with substantially all of the metal hydroxide to provide for a precipitate of metal sulfate and to produce ammonium hydroxide, and further adding 2 to 4 parts of 30% aqueous ammonium hydroxide solution per 100 parts of cresylic acid, the total ammonium hydroxide causing a secondary reaction between the cresylic acid and formaldehyde to produce a resinous substance, the temperature in the reacting mixture being maintained by heating to about 50 to 70° C. during moisture removal by evacuation and reaching a final temperature of 85° C. to 110° C., introducing a solvent into the reaction vessel after the secondary reaction has proceeded one and one-half to two and one-half hours to produce a resinous varnish solution and removing the precipitated metal sulfate from the varnish solution, the solvent comprising 35 to 100 parts of ethyl alcohol and 0 to 50 parts of benzene solvent.

WILLIAM C. WELTMAN.